United States Patent [19]

Bauer et al.

[11] Patent Number: 4,973,672

[45] Date of Patent: Nov. 27, 1990

[54] WATER-SOLUBLE AMINONAPHTHOL DISAZO DYESTUFFS, THEIR PREPARATION AND THEIR USE

[75] Inventors: Wolfgang Bauer, Maintal; Klaus Hunger, Kelkheim, both of Fed. Rep. of Germany

[73] Assignee: Cassella Aktiengesellschaft, Frankfurt am Main, Fed. Rep. of Germany

[21] Appl. No.: 331,085

[22] Filed: Mar. 27, 1989

Related U.S. Application Data

[63] Continuation of Ser. No. 77,589, Jul. 24, 1987, abandoned, which is a continuation of Ser. No. 909,631, Sep. 22, 1986, abandoned.

[30] Foreign Application Priority Data

Sep. 28, 1985 [DE] Fed. Rep. of Germany ....... 3534634

[51] Int. Cl.[5] ...................... C09B 35/08; C09B 35/10; C09B 35/14; C09B 35/16

[52] U.S. Cl. .................................. 534/825; 534/823; 534/824; 534/826; 534/561; 106/22

[58] Field of Search ................ 534/824, 825, 823, 826

[56] References Cited

U.S. PATENT DOCUMENTS

| | | | |
|---|---|---|---|
| 498,759 | 6/1893 | Bamman et al. | 534/824 |
| 498,873 | 6/1893 | Bamman et al. | 534/824 |
| 501,160 | 7/1893 | Pfitzinger | 534/824 X |
| 512,493 | 1/1894 | Ulrich et al. | 534/824 |
| 556,298 | 3/1896 | Bamman et al. | 534/824 |
| 579,773 | 3/1897 | Rudolph | 534/824 |
| 888,036 | 5/1908 | Ris et al. | 534/824 X |
| 2,036,159 | 3/1936 | Mendosa | 534/824 X |
| 2,400,092 | 5/1946 | Anderson . | |

FOREIGN PATENT DOCUMENTS

| | | | |
|---|---|---|---|
| 2149416 | 3/1973 | France | 534/824 |
| 63042 | 4/1971 | Luxembourg | 534/824 |
| 63513 | 5/1941 | Norway | 534/824 |
| 41593 | 1/1908 | Switzerland | 534/824 |
| 1889-13710 | of 1890 | United Kingdom | 534/824 |
| 1895-7549 | of 1896 | United Kingdom | 534/824 |
| 1907-27609 | of 1908 | United Kingdom | 534/824 |
| 329056 | 5/1930 | United Kingdom | 534/824 |
| 378750 | 8/1932 | United Kingdom | 534/824 |

OTHER PUBLICATIONS 43 304 04–1933 Switzerland Gesellschaft I 534 824 0 1.
43 307 07–1933 Switzerland Gesellschaft II 534 824 0 1.
Colour Index, 3rd Edition, vol. 4, pp. 4175 to 4179, 4195 to 4198, and 4204 to 4209 (1971).

*Primary Examiner*—Floyd D. Higel
*Attorney, Agent, or Firm*—Connolly and Hutz

[57] ABSTRACT

Coloring natural or synthetic fiber material containing hydroxyls or nitrogen is achieved by printing or dyeing the fiber material with a water-soluble disazo dyestuff of the formula

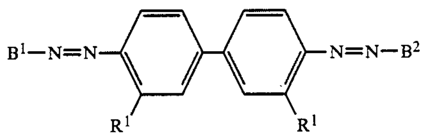

wherein $R^1$ is alkyl, alkoxy or alkoxyethoxy, each having 3–6 carbon atoms, $B^1$ is the radical of a 1-amino-8-hydroxynaphthalene monosulphonic or disulphonic acid and $B^2$ is the same as $B^1$ or another napthyl moiety.

5 Claims, No Drawings

WATER-SOLUBLE AMINONAPHTHOL DISAZO DYESTUFFS, THEIR PREPARATION AND THEIR USE

This application is a continuation, of application Ser. No. 077,589, filed July 24, 1987, now abandoned, which is a continuation of application Ser. No. 909,631 filed Sept. 22, 1986, now abandoned.

The present invention relates to water-soluble disazo dyestuffs of the formula I (I)

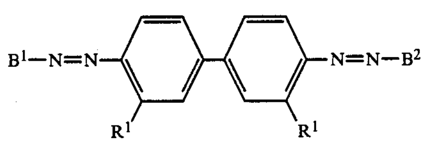

wherein $R^1$ denotes alkyl, alkoxy or alkoxyethoxy having in each case 3-6 C atoms, $B^1$ denotes the radical of an optionally N-monosubstituted 1-amino-8-hydroxynaphthalenemonosulphonic or 1-amino-8-hydroxynaphthalenedisulphonic acid of the formula II (II)

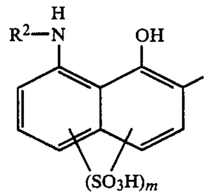

$R^2$ denotes hydrogen, alkyl having 1-4 C atoms, hydroxyalkyl having 2-4 C atoms, or sulphoalkyl or carboxyalkyl having 1-4 C atoms, m represents 1 or 2 and $B^2$ is equal to $B^1$ or denotes the radical of a coupling component of the 1-naphthol series of the formula III or 2-naphthol series of the formula IV (III)

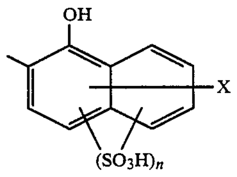

(IV)

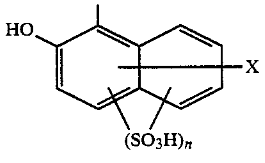

wherein X represents hydrogen, —OH, $—NH_2$, —NH—$R^2$, —Cl, —COOH, —CO—NH—Ar and n represents 0, 1 or 2 and Ar is optionally substituted phenyl or naphthyl.

The substituent X can be in positions 3 to 8 of the 1-naphthol or 2-naphthol radical, provided these are not occupied by sulpho groups. The same applies to the 1 or 2 sulpho groups which may be present in the naphthol radicals of the formulae III and IV. The bonding dash drawn through both rings of the naphthalene.skeleton to X and the bonds, directed into both rings, of the sulpho groups $(SO_3H)_m$ and $(SO_3H)_n$ symbolize this situation.

The dyestuffs of the formula I, the sulpho groups and, if present, carboxyl groups of which are preferably in the form of their alkali metal and/or ammonium salts, are excellently suitable for dyeing and printing natural or synthetic fibre materials containing hydroxyl groups and/or nitrogen, and for recording fluids.

The alkyl or alkoxy radical represented by $R^1$ and the alkoxy group in the alkoxyethoxy radical represented by $R^1$ can be straight-chain or branched. The following are examples of these radicals: n-propyl, isopropyl, n-butyl, i-pentyl, isopentyl, neo-pentyl, n-hexyl, isohexyl, 3,3-dimethyl-butyl, n-propoxy, isopropoxy, n-butoxy, n-pentyloxy, isopentyloxy, neopentyloxy, n-hexyloxy, isohexyloxy, methoxyethoxy, ethoxyethoxy, n-propoxyethoxy, isopropoxyethoxy, n-butoxyethoxy and isobutoxyethoxy. In the case of the alkoxyethoxy radicals, the alkoxy radical is in the 2-position of the ethoxy radical.

Preferred radicals $R^1$ are alkyl, alkoxy or alkoxyethoxy having in each case 3 or 4 C atoms.

$R^2$ represents, for example, hydrogen, methyl, ethyl, n-propyl, isopropyl, n-butyl, isobutyl, sec.-butyl, tert.-butyl, 2-hydroxyethyl, 3-hydroxypropyl, 4-hydroxybutyl, 2-sulphoethyl, 4-sulphobutyl, carboxymethyl, 2-carboxyethyl and 3-carboxypropyl. In the case of the radical of the formula II, $R^2$ preferably represents hydrogen.

The sulpho groups in the 1-amino-8-naphthol radicals of the formula II are preferably located in the 2-, 3-, 4- or 6-positions, particularly in the 4-position if $m=1$ and in the 2,4-, 3,6- and 4,6-positions if $m=2$.

Particularly preferred coupling components from which $B^1$ is derived and $B^2$ can be derived are 1-amino-8-hydroxy- naphthalene-3,6-disulphonic acid, 1-amino-8-hydroynaphthalene4,6-disulphonic acid, 1-amino-8-hydroxynaphthalene-2,4-disulphonic acid and 1-amino-8-hydroxynaphthaline-4-sulphonic acid.

In the 1-naphthol or 2-naphthol radicals of the formulae III and IV the sulpho groups, if present, are preferably in the 3-, 4-, 6- or 8-position, particularly in the 3-, 4- or 6-position if $n=1$, and in the 3,6-position or 6,8-position if $n=2$. The substituents X are preferably in the 3-, 7- or 8-position.

The phenyl and naphthyl radicals represented by Ar can be unsubstituted or can have up to three of the following substituents: chlorine, bromine, nitro or alkyl and/or alkoxy having in each case 1 or 2 C atoms. A phenyl radical represented by Ar is preferably unsubstituted or is monosubstituted by one of the substituents mentioned above or disubstituted by one of the above substitutents and an alkyl or alkoxy group having 1 or 2 C atoms, or trisubstituted by one of the above substituents and an alkyl or alkoxy group and an alkoxy group having 1 or 2 C atoms, in positions 2 to 5. A naphthyl radical represented by Ar is preferably unsubstituted.

Particularly preferred 1-naphthol and 2-naphthol coupling components from which $B^2$ can be derived are 1-naphthol, 1-naphthol-4-sulphonic acid, 1,7-dihydroxynaphthalene-3-sulphonic acid, 1,8-dihydroxynaphthalene-3,6-disulphonic acid, 2-amino-8-hydroxynaphthalene-6-sulphonic acid, 3-amino-5-hydroxynaphthalene-7-sulphonic acid, 2-methylamino-8-hydroxynaphthalene-6-sulphonic acid, 2-phenylamino-8-hydroxynaphthalene-6-sulphonic acid, 2-(2-hydroxyethyl)-amino-8-hydroxynaphthalene-6-sulphonic acid, 2-carboxymethylamino-8-hydroxynaphthalene-6-sulphonic acid, 2- sulphomethylamino-8-hydroxynaphthalene-6-sulphonic acid, 2naphthol, 2-naphthol-6-sulphonic acid, 2-naphthol-3,6-disulphonic acid, 2-hydroxynaphth-3-oic acid, 2-naphthol-6,8-disulphonic acid, 2-hydroxynaphth-3-oic acid anilide and 1-chloro-8-hydroxynaphthalene-3,6-disulphonic acid.

Disazo dyestuffs according to the invention which are preferred are those in which $B^1$ and $B^2$ represent the radical of an optionally N-monosubstituted 1-amino-8-hydroxynaphthalene-3,6-,4,6- or -2,4-disulphonic acid.

Preferred dyestuffs are also those in which $B^1$ and $B^2$ are identical and also those in which $R^1$ denotes n-propyl, isopropyl, n-butyl, sec.-butyl, isobutyl, n-propoxy, isopropoxy, n-butoxy, isobutoxy, sec.-butoxy, methoxyethoxy or ethoxyethoxy and, furthermore, those in which the total number of sulpho groups, n+m, is 3 or 4.

In particular, dyestuffs according to the invention having two or more preferred characteristics are also particularly preferred.

The water-soluble disazo dyestuffs, according to the invention, of the formula I (I)

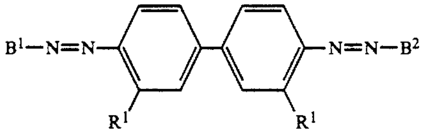

wherein $B^1$, $B^2$ and $R^1$ have the meanings mentioned above are prepared by coupling bisdiazonium compounds of the formula VI (V)

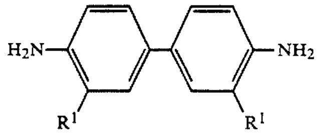

(VI)

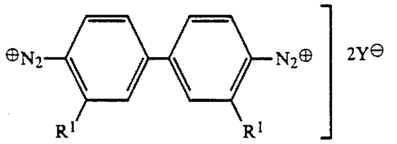

wherein $Y^{\theta}$ is an equivalent of an anion of a mineral acid, which have been prepared in a customary manner from 3,3'-disubstituted benzidine derivatives of the formula V, successively and in any desired sequence, with 1 mol of the coupling component $B^1$-H per mol of bisdiazonium compound and 1 mol of the coupling component $B^2$-H per mol of bisdiazonium compound, in an alkaline, preferably aqueous, reaction medium.

The dyestuffs according to the invention can thus be prepared by first coupling, in an alkaline reaction medium, 1 mol of a coupling component of the formula $B^1$-H per mol of bisdiazonium compound, $B^1$ having the meaning mentioned above, to give a diazotized monoazo dyestuff of the formula VII.

(VII)

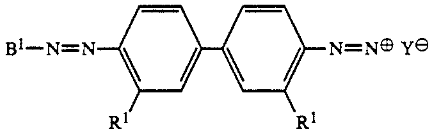

The final dyestuffs of the formula I are then obtained by coupling, under alkaline conditions, the diazotized monoazo dyestuff of the formula VII thus obtained with 1 mol of a coupling component of the formula $B^2$—H.

Alternatively, the disazo dyestuffs according to the invention can also be prepared by coupling the bisdiazonium compounds of the formula VI with 1 mol of a coupling component of the formula $B_2$—H per mol of bisdiazonium compound to give diazotized monoazo dyestuffs of the formula VIII (VIII)

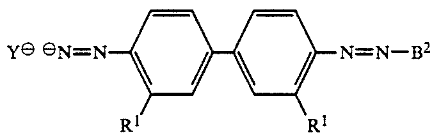

and by subsequently coupling the product finally with 1 mol of a coupling component of the formula $B^1$—H.

It will readily be understood that, in order to prepare dyestuffs according to the invention in which $B^1$ is identical with $B^2$, it is not necessary to carry out a two-stage coupling, but the bisdiazonium compound of the formula VI can be reacted in one stage with 2 mol of the coupling component concerned.

The bisdiazonium compounds are obtained from the benzidine derivatives of the general formula V in a manner which is in itself known by the action of at least 2 mol of nitrous acid or other systems forming nitrosonium ions in a mineral acid or a mineral acid aqueous medium or a lower alkanecarboxylic acid, such as, for example, formic acid, acetic acid or propionic acid or mixtures thereof, at temperatures from −15° C. to 40° C.

The preferred diazotization medium is dilute aqueous mineral acid, particularly a mineral acid which can supply the anion equivalent $Y^{\theta}$. The anion equivalent can be a monovalent anion, such as, for example, $Cl^{\theta}$ or $NO_3\theta$, but can also be the equivalent amount of a polyvalent anion, such as, for example, $\frac{1}{2}SO_4^{2\theta}$ or $\frac{1}{3}PO_4^{3}\theta$. Examples of suitable acids are therefore, preferably, a hydrogen halide acid, in particular hydrochloric acid, sulphuric acid or phosphoric acid.

The coupling reactions described, which are carried out within the pH range from 7 to 14, preferably 7.5 to 10, are preferably carried out in an aqueous reaction medium, and coupling accelerators which are in themselves known, such as pyridine, dimethylformamide, urea or thiourea, can be present.

The central components of the formula V which are incorporated in the dyestuffs according to the invention have proved to be toxicologically acceptable in the tests carried out hitherto.

The dyestuffs according to the invention are excellently suitable for dyeing natural or synthetic fibre materials containing hydroxyl groups or nitrogen, in particular cotton, regenerated cellulose, paper, wool, silk, polyamide and leather, and for recording fluids. Blue dyeings having a good depth of colour are obtained on the substrates mentioned. The dyeings are distinguished by good fastness properties, in particular good fastness to wet processing, for example fastness to water, washing at 40° C. and washing at 60° C., and by good fastness to perspiration (alkaline and acid), fastness to acids, fastness to solvents and fastness to rubbing.

EXAMPLE 1

(a) 8 g of 3,3'-di-n-butoxybenzidine dihydrochloride are introduced into 100 ml of water, 150 g of ice and 40 ml of 10N hydrochloric acid are added, and tetraazotization is carried out at 0°-5° C. by means of a solution of 14.4 g of sodium nitrite in 40 ml of water. Stirring is continued for approx. ½ hour and the excess of nitrite is then removed by adding sulphamic acid. The solution of the tetraazo compound thus prepared is then added, in the course of ½ hour, to a mixture of 66.9 g of 1-amino-8-hydroxynaphthalene-3,6-disulphonic acid, 22 ml of 10 N sodium hydroxide solution and 100.6 g of sodium carbonate in 300 ml of water and 200 g of ice.

The reaction mixture is stirred for a further three hours at 0°-5° C. and pH 8-9, and 200 g of sodium chloride and 160 ml of 10 N hydrochloric acid are then added until a pH value of 1 is reached.

The blue disazo dyestuff of the structure

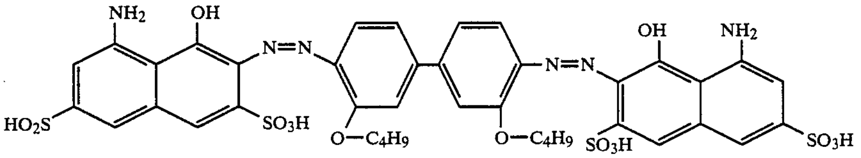

obtained after this is filtered off and dried at 70° C. Yield: 223.8 g of blue dyestuff powder (content of pure dyestuff: 43.2%.

(b) A solution of 0.2 g of sodium carbonate, 4 g of sodium sulphate and 1.5 g of dyestuff prepared in accordance with Example 1a, is prepared in 250 ml of water in a dyebath at 40° C. 10 g of cotton yarn are then kept in continuous agitation in the finished dye liquor, the temperature is raised to 95° C. and dyeing is continued for 45 minutes at this temperature.

the dyed cotton yarn is then removed from the residual liquor, which is still only slightly coloured, and residual liquor still adhering to the yarn is removed by wringing the latter out. The dyed material is then rinsed with cold water and dried at 60° C.

A blue dyeing of good depth of colour, having good fastness properties, in particular good fastness to water, washing and perspiration, is obtained.

Blue dyeings of fast colour and having a good level of fastness are also obtained on paper, polyamide or leather by means of the disazo dyestuff prepared in accordance with Example 1.

EXAMPLE 2

34.5 g of 3,3'-diisopropylbenzidine dihydrochloride in a mixture of 100 ml of water, 40 ml of 10 N hydrochloric acid and 150 g of ice are tetrazotized at 0°-5° C. by means of a solution of 14.4 g of sodium nitrite in 40 ml of water. Stirring is continued for a further hour at 0°-5° C., excess nitrous acid is removed by adding sulphamic acid, and the tetrazo solution is neutralized carefully with 4 g of sodium carbonate until a pH value of 2 is reached. After the tetrazo solution has been clarified by filtration, a solution of 36.3 g of disodium 1-amino-8-hydroxynaphthalene-3,6-disulphonate and 22.8 g of sodium carbonate in 120 ml of water is added at 0° C. in the course of 10 minutes. The mixture is stirred for a further 10 minutes and a solution of 26.1 g of monosodium 2-amino-8-hydroxynaphthalene-6-sulphonic acid and 6 g of sodium carbonate in 100 ml of water is then added rapidly. The resulting mixture is then stirred at pH 8-9 for a further three hours, 20% by volume of sodium chloride is added in order to improve the filterability of the dyestuff, and the pH is adjusted to a value of 2 by adding 10 N hydrochloric acid. The resulting dyestuff of the formula

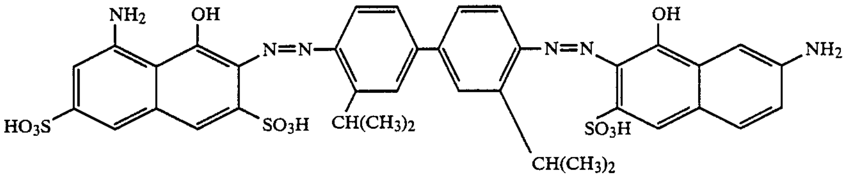

is filtered off and dried at 70°-80° C. Yield: 218.6 g of dark powder (dyestuff content: 38%).

Blue dyeings having good depth of colour and good fastness properties, in particular good fastness to water and perspiration, are obtained with this dyestuff on cotton, polyamide or leather.

Further blue aminoaphthol disazo dyestuffs according to the invention which can be prepared, for example, in accordance with the instructions of Examples 1 and 2 can be seen in the table below, in which the following data are given:

In column 1: The radical $R^1$ of the 3,3'-disubstituted benzidine derivative employed.

In column 2: the coupling component of the formula $B^1$—H.

In column 3: the coupling component of the formula $B^2$—H.

TABLE
Aminonaphthol disazo dyestuffs of the formula
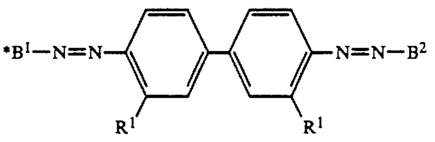
| Example | Substituent $R^1$ | Radical of the formula $B^1$ | Radical of the formula $B^2$ |
|---|---|---|---|
| 3 | $-O-CH_2-CH_2-OCH_3$ | 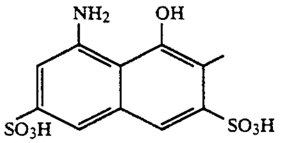 | 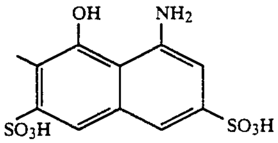 |
| 4 | $-CH(CH_3)_2$ | 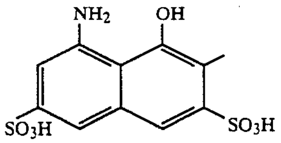 | 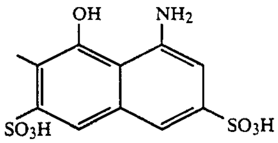 |
| 5 | $-O-CH_2-CH_2-CH_3$ | 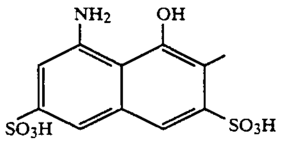 | 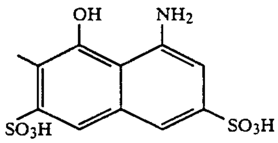 |
| 6 | $-O$-n-$C_4H_9$ | 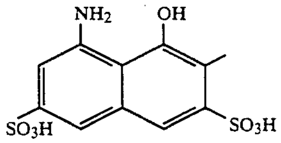 | 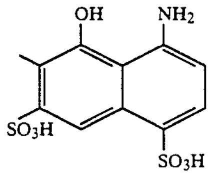 |
| 7 | $-O$-n-$C_4H_9$ | 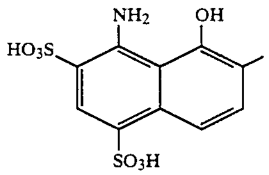 | 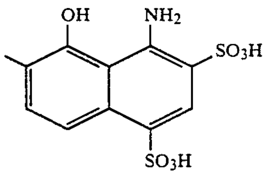 |
| 8 | 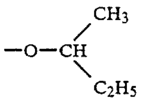 | 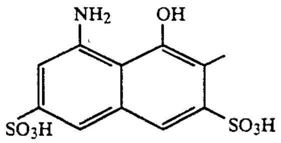 | 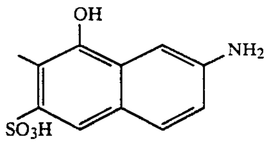 |
| 9 | $-CH(CH_3)_2$ | 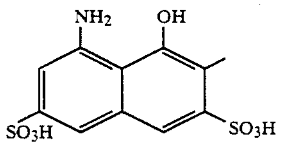 | 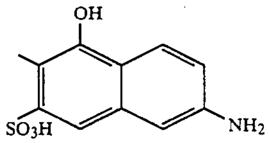 |
| 10 | $-CH(CH_3)_2$ | 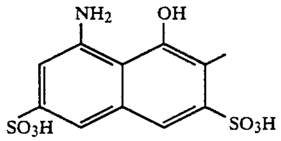 | 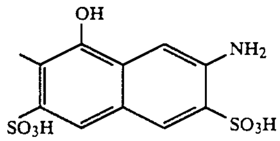 |
| 11 | $-CH(CH_3)_2$ | 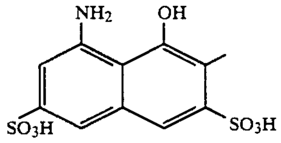 | 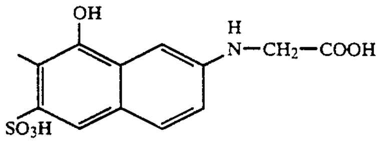 |

TABLE-continued
Aminonaphthol disazo dyestuffs of the formula
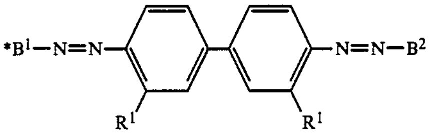
| Example | Substituent $R^1$ | Radical of the formula $B^1$ | $B^2$ |
|---|---|---|---|
| 12 | $-CH(CH_3)_2$ | 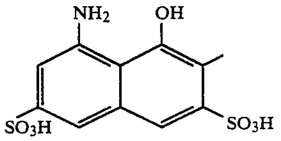 | 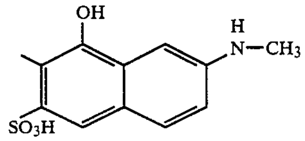 |
| 13 | $-CH(CH_3)_2$ | 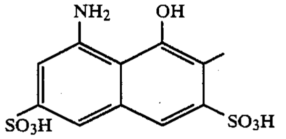 | 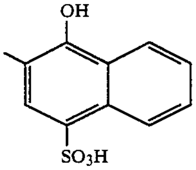 |
| 14 | $-O-n-C_4H_9$ | 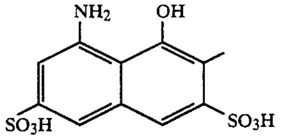 | 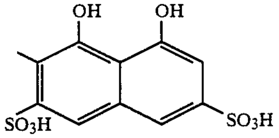 |
| 15 | $-O-n-C_4H_9$ | 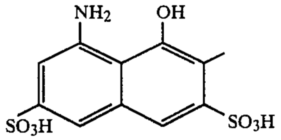 | 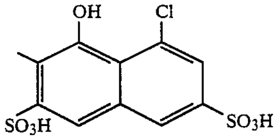 |
| 16 | $-CH(CH_3)_2$ | 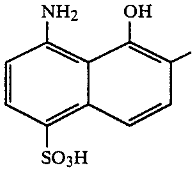 | 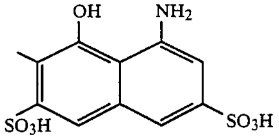 |
| 17 | $-O-n-C_4H_9$ | 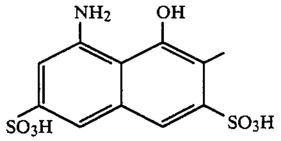 | 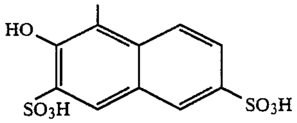 |
| 18 | $-O-n-C_4H_9$ | 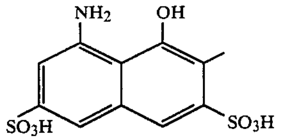 | 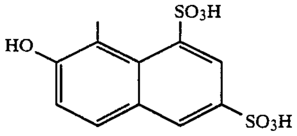 |
What is claimed is:
1. Water-soluble disazo dyestuff of the formula
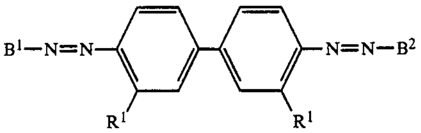
wherein $R^1$ is alkyl, alkoxy or alkoxyethoxy, each having 3-6 carbon atoms;
$B^1$ has the formula

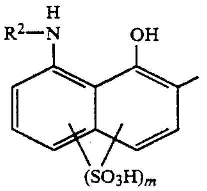

wherein $R^2$ is hydrogen, alkyl having 1–4 carbon atoms, hydroxyalkyl having 2–4 carbon atoms, sulphoalkyl having 1–4 carbon atoms or carboxyalkyl having 1–4 carbon atoms;

m is 1 or 2; and $B^2$ has the definition of $B^1$ or is of the formula

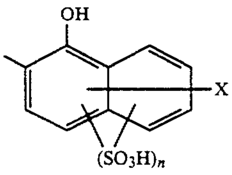
or
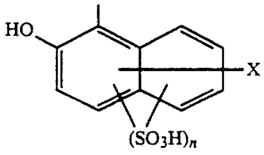

wherein X is hydrogen, —OH, —$NH_2$, —NH—$R^2$, —Cl, —COOH, —CO—NH—Ar, n is 0, 1 or 2; and Ar is phenyl or naphthyl; or Ar is phenyl monosubstituted by a —Cl, —Br, —$NO_2$, methyl, ethyl, methoxy or ethoxy; or Ar is phenyl substituted by two substituents wherein one is —Cl, —Br, or —$NO_2$ and the other is methyl, ethyl, methoxy or ethoxy; or Ar is phenyl substituted by three substituents, one of which is —Cl, —Br, or —$NO_2$, a second substituent is methyl, ethyl, methoxy or ethoxy, and a third substituent is methoxy or ethoxy; or Ar is napththyl substituted by a —Cl, —Br, —$NO_2$, methyl, ethyl, methoxy or ethoxy.

2. Water-soluble disazo dyestuff according to claim 1 wherein $R^1$ is alkyl, alkoxy or alkoxy-ethoxy, each having 3 or 4 carbon atoms.

3. Water-soluble disazo dyestuff according to claim 1 wherein groups, m+n, is three of four.

4. Water-soluble disazo dyestuff according to claim 1 wherein $B^2$ is the same as $B^1$.

5. Water-soluble disazo dyestuff according to claim 1 wherein $B^1$ and $B^2$ are both a 1-amino-8-hydroxynaphthalene disulphonic acid of the formula

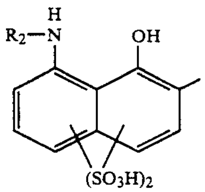

wherein the two sulphonic acid groups are in the 3,6 or 4,6 or 2,4 positions.

* * * * *

UNITED STATES PATENT AND TRADEMARK OFFICE
CERTIFICATE OF CORRECTION

PATENT NO. : 4,973,672

DATED : NOVEMBER 27, 1990

INVENTOR(S) : BAUER ET AL

It is certified that error appears in the above-identified patent and that said Letters Patent is hereby corrected as shown below:

In column 3, line 2, "2naphthol" should read --2-naphthol--.

In Column 4, formula VIII, " $\ominus$N" should read --$\oplus$N--.

In Column 5, line 61, "the" should read --The--.

In Column 12, Claim 3, the phrase "three of four" should read --three or four--.

Signed and Sealed this

Fourth Day of June, 1991

*Attest:*

HARRY F. MANBECK, JR.

*Attesting Officer* *Commissioner of Patents and Trademarks*